United States Patent

Cram

[15] 3,638,106
[45] Jan. 25, 1972

[54] METHOD AND APPARATUS FOR INVESTIGATING THE SPONTANEOUS POTENTIAL OF EARTH FORMATIONS

[72] Inventor: Milton E. Cram, Houston, Tex.
[73] Assignee: Schlumberger Technology Corporation, New York, N.Y.
[22] Filed: Dec. 3, 1969
[21] Appl. No.: 881,794

[52] U.S. Cl. ................................................324/1, 324/10
[51] Int. Cl. ................................................G01v 3/18
[58] Field of Search ................................................324/1, 10

[56] References Cited

UNITED STATES PATENTS

| | | | |
|---|---|---|---|
| 2,728,047 | 12/1955 | Doll | 324/1 |
| 3,268,801 | 8/1966 | Clements et al. | 324/10 |

*Primary Examiner*—Gerard R. Strecker
*Attorney*—Leonard R. Fellen, Donald H. Fidler, Stewart F. Moore, Jerry M. Presson, Edward M. Roney, William R. Sherman and John P. Sinnott

[57] ABSTRACT

In accordance with illustrative embodiments of the present invention, methods and apparatus are disclosed for obtaining a relatively noiseless measure of the spontaneous potential of earth formations surrounding a borehole. More particularly, the naturally occurring potentials on an electrode carried by a well tool on the end of a cable, on an electrode located at the surface of the earth, and on the armor of the supporting cable are measured. The potential measured on the well tool electrode is referenced to the potential measured on the armor at high frequencies and to the potential measured on the surface located electrode at low frequencies to provide an output signal which is representative of the formation spontaneous potential.

12 Claims, 4 Drawing Figures

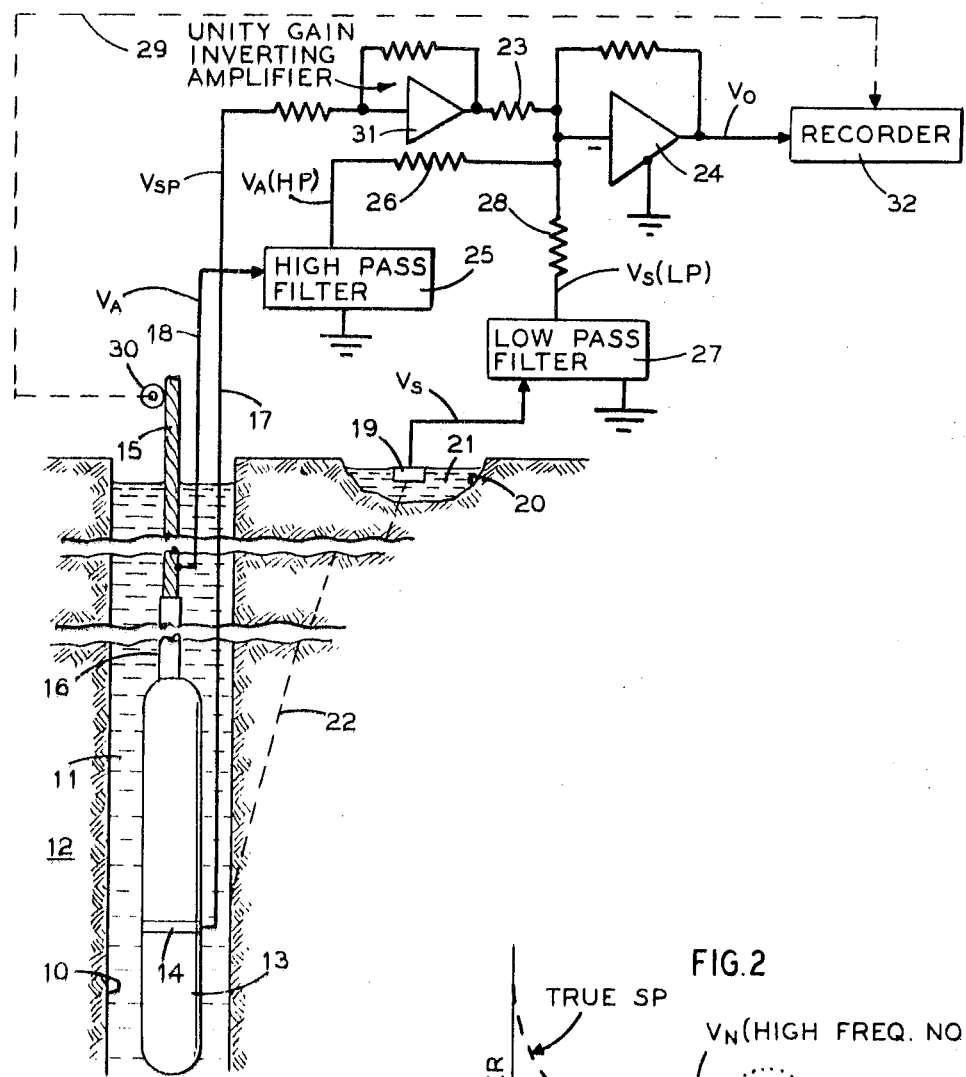
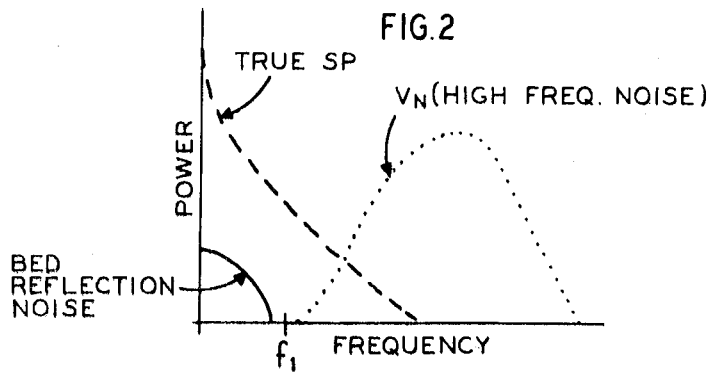
INVENTOR.
Milton E. Cram
BY
Edward M. Roney
ATTORNEY

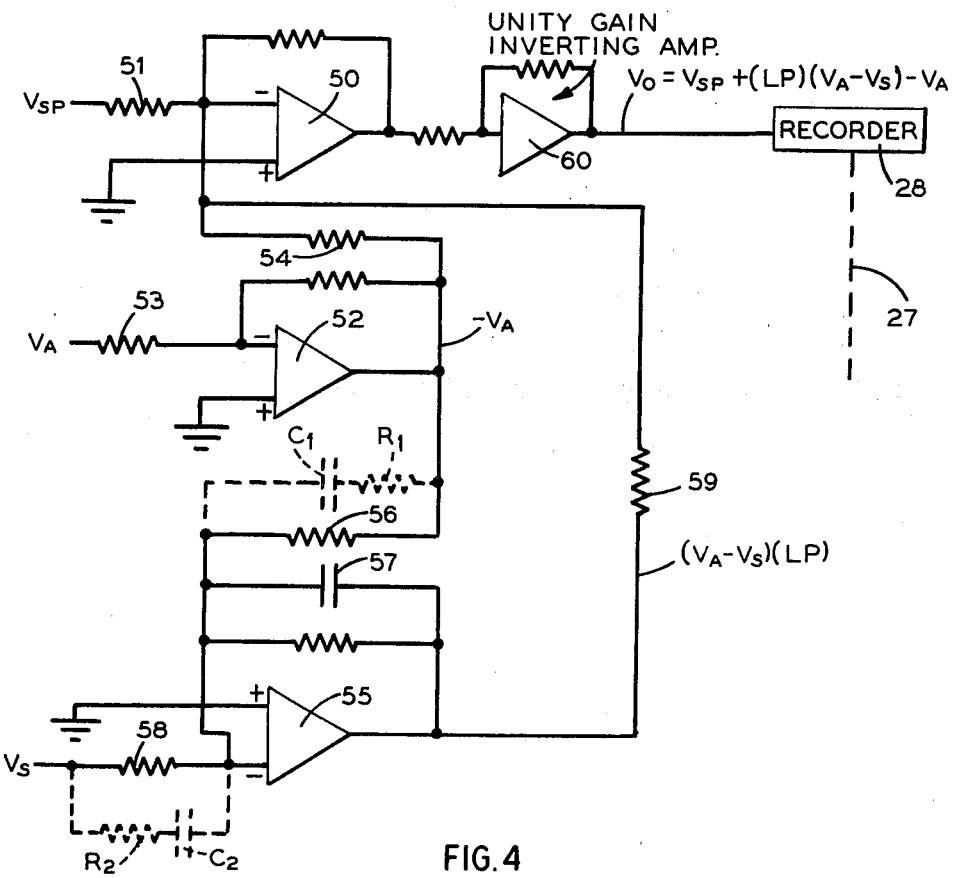
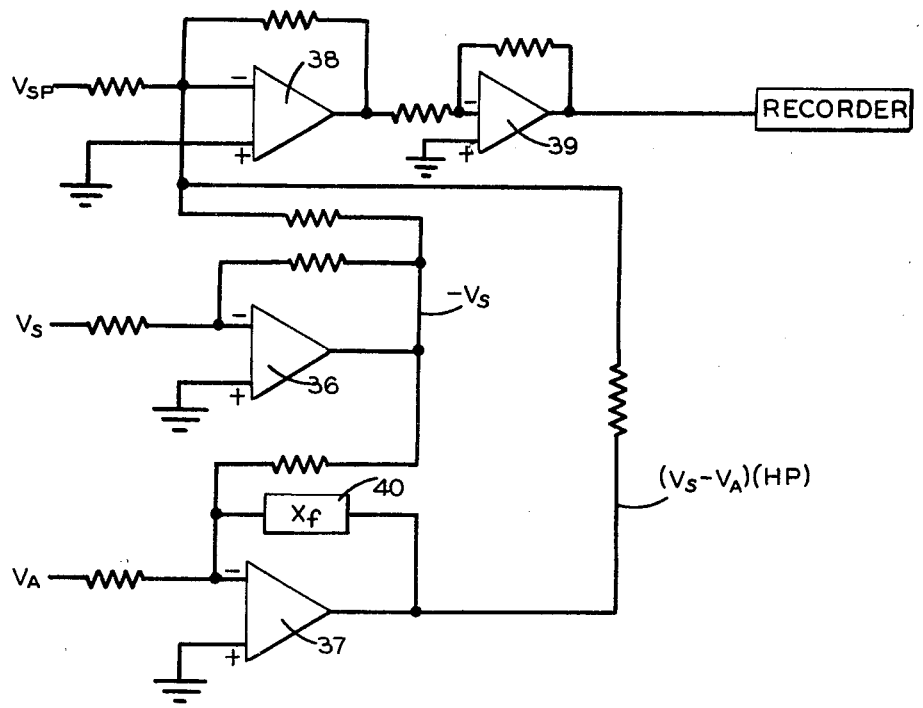

METHOD AND APPARATUS FOR INVESTIGATING THE SPONTANEOUS POTENTIAL OF EARTH FORMATIONS

This invention relates to well logging methods and apparatus and more specifically to methods and apparatus for attaining indications of spontaneous potentials existing in earth formations traversed a borehole.

Spontaneous potential, or self potential, hereinafter called SP, is the potential produced naturally by electrochemical phenomena in the formation. This electrochemical phenomena causes electromotive forces to be produced at the contacts between the drilling mud for its filtrate and the formation water in the pores of the permeable beds and across the adjacent shales. In the typical SP logging method, the potential is measured between a surface reference electrode and an electrode in the column of conductive mud as this latter electrode is pulled up past different formations. The reference electrode is supposed to be at a stable potential such that the potential differences measured between these two electrodes at different depth levels will be accurately representative of the SP values at different depth levels relative to one another. The character of the SP log produced by such measurements depends a great deal on the mud and formations encountered and is used to detect permeable beds and obtain values of formation water resistivity.

While systems for measuring the SP have proved generally satisfactory in the past, there are unfortunately a number of factors which can cause errors to be introduced into the usual SP measurement made by the usual SP measuring system. For example, noise due to magnetism is often induced into the usual SP measuring system by the magnetic field of a magnetized moving part of the reeling mechanism which pays out and takes in the cable at the surface of the earth. Other sources of error comprise magnetic fields set up by stray current from a variety of different sources, such as electric currents and generators located at the surface of the earth and electric currents flowing in the earth, such as telluric currents, which produce potential variations in the SP measuring system near the surface of the earth.

It is well known that the amount of voltage $V_N$ induced in a circuit by a stray magnetic field is:

$$V_N = -\int \frac{dB}{dt} \cdot dA$$

where $B$ is the flux density of the magnetic field,
$t$ is time, and
$A$ is the area of the circuit loop which is normal to the magnetic field.

For the usual SP measuring system, $A$ is quite large and the noise voltage $V_N$ is substantial. Since the sources of this noise voltage $V_N$ must be time dependent and $V_N$ is proportional to the time rate of change of $B$ thus signifying that $V_N$ increases with increasing frequency of the magnetic field, this noise component $V_N$ is primarily a high-frequency noise component. Thus, $V_N$ will hereinafter be referred to as high-frequency noise.

To overcome this high-frequency noise problem, it has been suggested in the past to reference the SP electrode to the cable armor wire at a location near the tool rather than a surface located reference electrode. This cable armor wire is the metal outer portion of the cable which supports the well tool in the borehole. There is usually 100 feet or so of insulation covering this armor above the well tool. If the potential difference is measured between the usual SP electrode and the cable armor, the area defined by the loop consisting of the conductors connected to the armor and SP electrode is negligible and therefore the total noise voltage $V_N$ induced in these conductors is also negligible. Moreover, the remote location of the bottom portion of the cable armor relative to the equipment at the surface of the earth which produces such high-frequency noise also helps to minimize the high-frequency noise pickup in such a measuring scheme. Thus, such an SP measuring scheme will be almost totally insensitive to this high-frequency noise.

However, such an SP electrode to armor measuring scheme is not free of all error. Unfortunately, if any part of the armor, which has a finite resistivity, is adjacent a formation bed having a significant SP, the potential of the armor will be at a potential which depends to some extent on this SP, thus producing an error in the resulting SP measurement. For this reason, such a measuring scheme has not been used in the past to any significant extent.

It is therefore an object of the present invention to provide new and improved methods and apparatus for measuring the spontaneous potential of earth formations adjoining a borehole.

In accordance with the present invention, methods and apparatus for measuring the spontaneous potential of earth formations adjacent a borehole comprises moving a plurality of electrodes through a borehole which electrodes include a first electrode having a relatively great length and a second electrode of length substantially less than that of the first electrode. A third electrode is located at the surface of the earth. The invention further comprises measuring the naturally occurring potentials on each of the electrodes and processing the measured potentials to produce an output signal representative of the spontaneous potential of an earth formation. This processing can be accomplished by passing only low-frequency components of the surface electrode potential and high-frequency components of the first electrode potential, combining these filtered measurements to produce a reference potential, and referencing the potential on the second electrode to this reference potential to produce an output signal representative of the spontaneous potential of an earth formation. Also, the first and surface electrode potentials can be suitably filtered and combined with unfiltered versions of the potentials on the second electrode and the first or surface electrodes. Desirably, the first electrode is the armor of a cable which supports the second electrode in the borehole.

For a better understanding of the present invention, together with other and further objects thereof, reference is had to the following description taken in connection with the accompanying drawings, the scope of the invention being pointed out in the appended claims.

Referring to the drawings:

FIG. 1 illustrates a well logging tool in a borehole along with apparatus constructed to process signals produced by the well logging tool in accordance with one embodiment of the present invention;

FIG. 2 illustrates a plot of power versus frequency for several parameters of interest;

FIG. 3 illustrates signal processing apparatus constructed in accordance with another embodiment of the present invention; and FIG. 4 illustrates still another embodiment of signal processing apparatus constructed in accordance with the present invention.

Referring now to FIG. 1, there is shown a borehole 10 filled with a suitable conductive drilling mud 11 transversing earth formations 12. A well logging tool 13 having an SP electrode 14 is supported in the borehole 10 on the end of an armored multiconductor cable 15. The lower 100 feet or so of the cable 15 is covered with a suitable insulation material 16. A pair of conductors 17 and 18 connect the SP electrode 14 and the armor of the cable 15 to suitable electronic circuitry at the surface of the earth. In reality, these conductors are part of the cable 15 but are shown separate therefrom for purposes of clarity of the electrical diagram. A surface reference electrode 19 is located at the surface of the earth in a pit 20 filled with a conductive fluid 21 such that the electrode 19 will make good electrical contact with the earth.

Before proceeding with the discussion of the surface electrical circuitry, it would first be desirable to explain how the potentials measured on the SP electrode 14, the armor electrode 15 and the surface electrode 19 are to be processed in accordance with the present invention. As discussed earlier, the usual practice for measuring the SP is to measure the difference between the potential on the SP electrode 14 and the potential on the surface electrode 19. When measuring the potential difference between these two electrodes, the measuring circuit comprises the conductor 17 through the cable 15 to the SP electrode 14 and the return current path through the earth formations from the SP electrode 14 to the surface electrode 19 (represented by the dashed line 22) and the high input impedance amplifier (not shown in FIG. 1) utilized for making this potential difference measurement. Since, as discussed earlier, the amount of high-frequency noise voltage $V_N$ induced into the measuring circuit is equal to $$V_N = -\int \frac{dB}{dt} \cdot dA$$

and the area $A$ is the portion of earth lying between the cable 15 and the return current path 22, the magnitude of the noise voltage $V_N$ will be quite significant when utilizing this type of measuring system.

As discussed earlier, it has been suggested to measure the difference in potential between the SP electrode 14 and the armor 15 to circumvent this problem. The reason why this noise voltage $V_N$ would be quite small in this case is that the conductors 17 and 18 both pass through the cable 15 thus creating a very small area for the measuring circuit.

Unfortunately, as discussed earlier, as the armor of the cable 15 moves, portions of the armor will move across formation beds having significant SP's and the armor potential will vary. However, because of the long length of the armored cable, this last-mentioned type of noise, which will hereinafter be referred to as bed reflection noise, will have a very low spatial, and hence, time variation. This is because of the averaging effect of the cable armor on the SP's of the formation beds adjacent to the armor in conjunction with the relatively slow logging speed. This bed reflection noise does not affect the usual SP measurement made between the SP electrode 14 and the surface reference electrode 19 since both electrodes have finite dimensions.

From the above discussion, it can be seen that if the surface electrode 19 is utilized as a reference electrode for the SP electrode 14, the relatively high-frequency noise $V_N$ will be substantial and the low-frequency bed reflection noise will be negligible. On the other hand, if the armor of the cable 15 is utilized as the reference electrode for the SP electrode 14, it can be seen that the high-frequency noise $V_N$ is negligible while the low-frequency, bed reflection noise is substantial. This is better illustrated in FIG. 2 where there is shown a plot of power versus frequency for the true SP signal, bed reflection noise and high-frequency noise. From FIG. 2 it can be seen that both the bed reflection noise and high frequency noise overlap the true SP in the frequency domain. It can also be seen that bed reflection noise exists exclusively at low frequencies and the high-frequency noise, of course, exists exclusively at high frequencies.

In accordance with the present invention, it has been found that the potentials on the three named electrodes, i.e., on the SP electrode 14, the armor of cable 15, and the surface electrode 19, exhibit power versus frequency characteristics which enable these measurements to be processed in a manner which will produce a relatively noiseless SP. This is accomplished by referencing the SP electrode 14 to the surface reference electrode 19 for low-frequency components only and referencing it to the armor of the cable 15 for high-frequency components only.

To this end, referring back to FIG. 1, the conductor 17 connected to the SP electrode 14 supplies the current proportional to the measured potential $V_{SP}$ on electrode 14 through a unity gain inverting amplifier 31 or the inverting input of an operational amplifier 24 via an input resistor 23. The measured armor potential $V_A$ is supplied to a high-pass filter 25 which operates to pass only the high-frequency components of $V_A$. A current proportional to these high-frequency components of $V_A$ is applied to the inverting input of the operational amplifier 24 via a summing resistor 26. The potential $V_s$ on the surface reference electrode 19 is applied to a low-pass filter 27 which operates to pass only the low-frequency components of $V_s$. A current proportional to the low-frequency component of $V_s$ is applied to the negative input of operation amplifier 24 via a summing resistor 28. The output signal from the operational amplifier 24, designated $V_o$, is applied to a suitable recorder 32 whose record medium is driven as a function of the movement of the well tool by a rotating shaft 29. The rotating shaft 29 is connected to a measuring wheel 30 which is in engagement with the cable 15 so as to rotate as the cable moves.

All of the surface electronic circuits are connected to a common ground, e.g., the logging truck chassis. Since the amplifier 24 operates to subtract $V_A$ (HP) and $V_s$ (LP) from $V_{SP}$, the exact potential of this chassis ground is unimportant since any error will cancel out in the subtraction process. The values of input, summing, the feedback resistors can be selected to give the desired results. Thus, the resistors 23, 26 and 28 should be set such as to give the proper weighting factors in accordance with equation (1). The feedback resistors, in combination with resistors 26 and 28, can be set at a value to give the desired gain.

In operation, the potential $V_{SP}$ on the SP electrode 14 is referenced to the potential on the surface electrode 19 at low frequencies and to the potential on the armor of the cable 15 at high frequencies. Desirably, the crossover point for the high and low-pass filters 25 and 27 is at the frequency $f_1$ illustrated in FIG. 2. For best results, the sum of the transfer functions for the high and low-pass filters 25 and 27 will equal "1" all for frequencies of interest.

The armor of the cable 15 should desirably be far enough from the SP electrode 14 so as to not influence the potential being independently measured on the SP electrode 14. While in present practice the lower 100 feet or so of the armored cable is covered with insulation material such that, for present purposes, the end of the armor is 100 feet from the SP electrode 14, it could actually be much closer for good results. The exposed armor should desirably be long enough so that the rate of change (i.e., the frequency) of the potential on the armor for the worst case (taking into account such things as logging speed, bed thicknesses, etc.) will not overlap to any great extent the frequency range of the so-called high-frequency noise which affects the measured potential difference between the SP electrode 14 and surface electrode 19. Thus, instead of the armor, a relatively long electrode located a sufficient distance from the SP electrode 14 could be utilized instead. The frequency ranges for the bed reflection and high-frequency noise determine the crossover frequency of the filter circuits. These frequency ranges can be determined empirically for any given conditions and set of equipment. (Note: The frequency range of the bed reflection noise is dependent on such things as logging speed, bed thicknesses, and length of the armor, while for the high-frequency noise, this frequency range is defined by the parameters of the noise sources, e.g., the operating frequency of a surface located motor or generator.) A desirable range for this crossover frequency has been found to be 0.005 to 0.1 hertz for a logging speed of 6,000 feet per hour.

The equation for the output voltage from operational amplifier 24 can be written as:

$$V_o = V_{SP} - (HP)V_A - (LP)V_s$$

where (HP) is the transfer function for the high pass filter 25 and (LP) is the transfer function for the low pass filter 27. As stated earlier, the sum of the transfer functions for the high and low pass filters 25 and 27 should desirably equal "1" for all frequencies of interest, i.e.:

$$LP + HP = 1 \qquad (2)$$

Equation (2) can be manipulated to give:

$$HP = 1 - LP \qquad (3) \text{ or}$$
$$LP = 1 - HP \qquad (4)$$

Substituting equation (3) into equation (1) gives the following:

$$V_o = V_{SP} - (1-LP)V_A - (LP)V_s \quad (5)$$

or $$V_o = V_{SP} - V_A - (LP)(V_A - V_s) \quad (6)$$

Turning now to FIG. 3, there is shown another embodiment of a signal processing circuit adapted to combine the measured potentials in accordance with equation (6) to produce a true noiseless SP. In FIG. 3, a current proportional to the measured voltage $V_{SP}$ on the SP electrode 17 is applied to the inverting input of an operational amplifier 50 by way of an input resistor 51. A current proportional to the armor voltage $V_A$ is applied to the inverting input of an operation amplifier 52 by way of an input resistor 53. The output signal from amplifier 52 is then applied to the inverting input of the operational amplifier 50 via a summing resistor 54 to produce the $V_A$ term of equation (6). This output signal from amplifier 52 is also applied to the inverting input of an operational amplifier 55 via an input resistor 56. The amplifier 55 has a capacitor 57 connected across its feedback resistor such that the combination operates as a low-pass filter. The transfer function of this low-pass filter is the term LP of equation (6).

A current proportional to the voltage $V_s$ measured on the surface electrode 16 is applied to the inverting input of the amplifier 55 via an input resistor 58. The amplifiers 52 and 55 operate to subtract the measured surface electrode voltage $V_s$ from the measured armor voltage $V_A$ and, in combination with the capacitor 57 and feedback resistor thereof, to apply the low-pass filter transfer function $LP$ to this quantity such that the output signal from amplifier 55 is proportional to $+(V_A - V_s)(LP)$. This output signal is applied to the inverting input of the amplifier 50 via a summing resistor 59. The amplifier 50 operates to combine the quantity $V_A$ and the quantity $V_{SP} + LP(V_A - V_s)$ in accordance with equation (6). Amplifier 60 inverts the output of amplifier 50 produces the output signal $V_o$ for application to the recorder 28.

The values of the input, summing the feedback resistors of FIG. 3 can be appropriately selected to provide optimum results. If desired, a series connected resistor and capacitor could be connected in parallel with the input resistor 56, as represented by the dotted line connected resistor and capacitor $R_1C_1$ in FIG. 3, to provide a sharper filtering. In this case, a series connected resistor and capacitor would have to be connected across the input resistor 58, as represented by the dotted line resistor $R_2$ and capacitor $C_2$, to provide $(HP)+(LP)=``1$.

By substituting equation (4) into equation (1), the following expressions result:

$$V_o = V_{SP} - (HP)V_A - (1-HP)V_s \quad (7)$$

or $$V_o = V_{SP} - V_s = (HP)(V_s - V_A) \quad (8)$$

Turning now to FIG. 4, there is shown apparatus for implementing equation (8). This apparatus of FIG. 4 is similar in construction to that of FIG. 3 except that a high-pass filter is utilized instead of a low-pass filter. A current proportional to the measured potential $V_s$ is applied to an amplifier 36 whose output signal and a current proportional to the armor potential $V_A$ are summed by an amplifier 37. The amplifier 37 has a feedback circuit 40 which is constructed such that the combination of amplifier 37 and feedback circuit 40 constitutes a high-pass filter. The output signal from amplifier 37 is thus proportional to $(V_s - V_A)(HP)$ and is summed with the signal from amplifier 36 and a current proportional to $V_{SP}$ at the negative input to an amplifier 38. After inversion by an amplifier 39, a signal proportional to $V_{SP} - V_s + (HP)(V_s - V_A)$ in accordance with equation (8) is recorded versus depth.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for measuring the spontaneous potential of earth formations adjacent a borehole, comprising:
   a plurality of electrodes adapted for movement through a borehole, said electrodes including a first electrode having a relatively great length and a second electrode of length substantially less than that of said first electrode;
   a third electrode located at the surface of the earth;
   high-pass filter means responsive to the potential on said first electrode for passing the high-frequency components of said first electrode potential;
   low-pass filter means responsive to the potential on said surface located electrode for passing the low-frequency components of said surface electrode potential;
   means for combining said passed high and low-frequency components to produce a reference signal; and
   means for referencing the potential on said second electrode to said reference potential to produce an output signal representative of the spontaneous potential of an earth formation.

2. Apparatus for measuring the spontaneous potential of earth formations adjacent a borehole, comprising:
   a plurality of electrodes adapted for movement through a borehole, said electrodes including a first electrode having a relatively great length and a second electrode of length substantially less than that of said first electrode;
   a third electrode located at the surface of the earth;
   means responsive to the potentials on said electrodes for producing an output signal representative of the spontaneous potential of an earth formation, including first combining means responsive to the potentials on said surface located electrode and said first electrode for producing a filtered signal representative of certain frequency components of a relationship between the potentials on said surface located and first electrodes, and second combining means for combining said filtered signal with representations of the potentials on said first or surface electrodes and said second electrode to produce an output signal representative of the spontaneous potential of an earth formation.

3. The apparatus of claim 2 wherein said first combining means includes means for producing a filtered signal representative of the low-frequency components of the difference between the potentials on said first and surface electrodes, and said second combining means includes means for adding a representation of the potential on said second electrode to said filtered signal and substrating a representation of the potential on said first electrode therefrom to produce said output signal.

4. The apparatus of claim 2 wherein said first combining means includes means for producing a filtered signal representative of the high-frequency components of the difference between the potentials on said surface and first electrodes, and said second combining means includes means for adding the potential on said second electrode to said filtered signal and subtracting the potential on said surface located electrode therefrom to produce said output signal.

5. Apparatus for measuring the spontaneous potential of earth formations adjacent a borehole, comprising:
   a plurality of electrodes adapted for movement through a borehole, said electrodes including a first electrode having a relatively great length and a second electrode of length substantially less than that of said first electrode;
   a third electrode located at the surface of the earth;
   first amplifier means responsive to the potential on said first electrode for producing an amplified representation of the first electrode potential;
   second amplifier means for subtracting a representation of the potential on said surface located electrode from said amplified representation of the first electrode potential, said second amplifier having a feedback means associated therewith such that the combination of said feedback means and second amplifier means operates as a low-pass filter wherein the output signal from said combination is representative of the low-frequency components of a difference between the potentials on said first and surface located electrodes;

third amplifier means for subtracting said amplified representation of the first electrode potential from an additive combination of said output signal from said amplifier and feedback means and a representation of the potential on said second electrode to thereby produce said spontaneous potential representative output signal.

6. Apparatus for measuring the spontaneous potential of earth formations adjacent a borehole, comprising:
a plurality of electrodes adapted for movement through a borehole, said electrodes including a first electrode having a relatively great length and a second electrode of length substantially less than that of said first electrode;
a third electrode located at the surface of the earth;
first amplifier means responsive to the potential on said first electrode for producing an amplified representative of the first electrode potential;
second amplifier means for subtracting said amplified representation of the first electrode potential from a representation of the potential on said surface located electrode, said second amplifier means having a feedback means associated therewith such that the combination of said feedback means and second amplifier means operates as a high-pass filter wherein the output signal from said combination is representative of the high-frequency components of the difference between the potentials on said surface located and first electrodes;
third amplifier means for subtracting said amplified representation of the surface electrode potential from an additive combination of said output signal from said amplifier and feedback means and a representation of the potential on said surface located electrode to thereby produce said spontaneous potential representative output signal.

7. The apparatus of claim 1 wherein said first electrode is the armor of a cable which supports said second electrode in a borehole.

8. The apparatus of claim 2 wherein said first electrode is the armor of a cable which supports said second electrode in a borehole.

9. A method of measuring the spontaneous potential of earth formations adjacent a borehole, comprising:
moving a plurality of electrodes through a borehole, said electrodes including a first electrode having a relatively great length and a second electrode of length substantially less than that of said first electrode;
measuring the potentials on each of said electrodes and an electrode located at the surface of the earth;
passing the high-frequency components of said first electrode potential and the low-frequency components of said surface electrode potential;
combining said passed high and low-frequency components to produce a reference signal; and
referencing the potential on said second electrode to said reference potential to produce an output signal representative of the spontaneous potential of an earth formation.

10. A method of measuring the spontaneous potential of earth formations adjacent a borehole, comprising:
moving a plurality of electrodes through a borehole, said electrodes including a first electrode having a relatively great length and a second electrode of length substantially less than that of said first electrode;
measuring the potentials on said electrodes and a third electrode located at the surface of the earth;
producing a filtered signal representative of certain frequency components of a relationship between the potentials on said surface located and first electrodes;
combining said filtered signal with representations of the potentials on said first or surface electrodes and said second electrode to produce an output signal representative of the spontaneous potential of an earth formation.

11. The method of claim 10 wherein the step of producing a filtered signal includes the step of producing a filtered signal representative of the low-frequency components of the difference between the potentials on said first and surface electrodes, and the step of combining includes adding a representation of the potential on said second electrode to said filtered signal and subtracting a representation of the potential on said first electrode therefrom to produce said output signal.

12. The apparatus of claim 10 wherein the step of producing a filtered signal includes the step of producing a filtered signal representative of the high-frequency components of the difference between the potentials on said surface and first electrodes, and the step of combining includes adding a representation of the potential on said second electrode to said filtered signal and subtracting a representation of the potential on said surface located electrode therefrom to produce said output signal.

* * * * *